United States Patent [19]

Konishi et al.

[11] Patent Number: 4,681,733

[45] Date of Patent: Jul. 21, 1987

[54] PROCESS FOR FIXING ALLOY POWDER MOLDING AT SINTERING

[75] Inventors: Toshiharu Konishi; Yukio Shimizu; Takahumi Sakuramoto, all of Osaka; Tsuyoshi Morishita; Shigemi Osaki, both of Hiroshima, all of Japan

[73] Assignee: Nitto Electric Industrial Co., Ltd.: Mazda Motor Corporation, Japan

[21] Appl. No.: 777,563

[22] Filed: Sep. 18, 1985

Related U.S. Application Data

[63] Continuation of Ser. No. 705,180, Feb. 25, 1985, abandoned.

[30] Foreign Application Priority Data

Feb. 24, 1984 [JP] Japan ................................. 59-34887

[51] Int. Cl.⁴ .............................................. B22F 7/00
[52] U.S. Cl. .......................................... 419/8; 419/36; 419/37; 419/43; 419/54
[58] Field of Search ....................................... 419/5–9, 419/36, 37, 69, 50, 43, 54

[56] References Cited

U.S. PATENT DOCUMENTS

| | | | |
|---|---|---|---|
| 2,949,445 | 8/1960 | Blake | 526/312 |
| 3,178,385 | 4/1965 | Dinges et al. | 526/312 |
| 3,711,452 | 1/1973 | Csontos | 526/273 |
| 3,817,946 | 6/1974 | Ree | 526/273 |
| 3,853,827 | 12/1974 | Klatil et al. | 526/320 |
| 3,879,357 | 4/1975 | Wingler et al. | 526/317 |
| 3,896,072 | 7/1975 | Tuemmler et al. | 526/317 |
| 3,954,460 | 5/1976 | Nickola | 419/36 |
| 4,052,527 | 10/1977 | Pastor et al. | 526/320 |
| 4,126,451 | 11/1978 | Nayar | 419/8 |
| 4,158,688 | 6/1979 | Pett | 419/37 |
| 4,563,329 | 1/1986 | Morishita | 419/36 |

Primary Examiner—Stephen J. Lechert, Jr.
Attorney, Agent, or Firm—Sughrue, Mion, Zinn Macpeak & Seas

[57] ABSTRACT

A method for fixing an alloy powder molding at sintering composition by placing an alloy powder molding formed by rolling a mixture of an alloy powder and a synthetic resin-based pressure-sensitive adhesive composition on a metal base material by interposing a composition between the molding and the base material until the molding is sintered, in the case that the alloy powder molding is placed on the metal base material and sintered after keeping at 150° to 400° C. for at least 5 minutes under a non-oxidizing atmosphere, the composition comprising as a main component an acrylic copolymer which comprises about 80 to 99.5% by weight of alkyl (meth)acrylate having an average carbon atom number of 2 to 12 in the alkyl moiety and about 20 to 0.5% by weight of a polymerizable monomer having a functional group in the molecule or a mixture of 100 parts by weight of the copolymer and about 0.1 to 100 parts by weight of a resin which gives adhesive property, the composition having a 10 second shear creep compliance of about 0.1 to $30 \times 10^{-6}$ cm²/dyne at room temperature and at least about 30% by weight of non-volatile materials when heated at 300° C. for 80 minutes under a non-oxidizing atmosphere.

6 Claims, 1 Drawing Figure

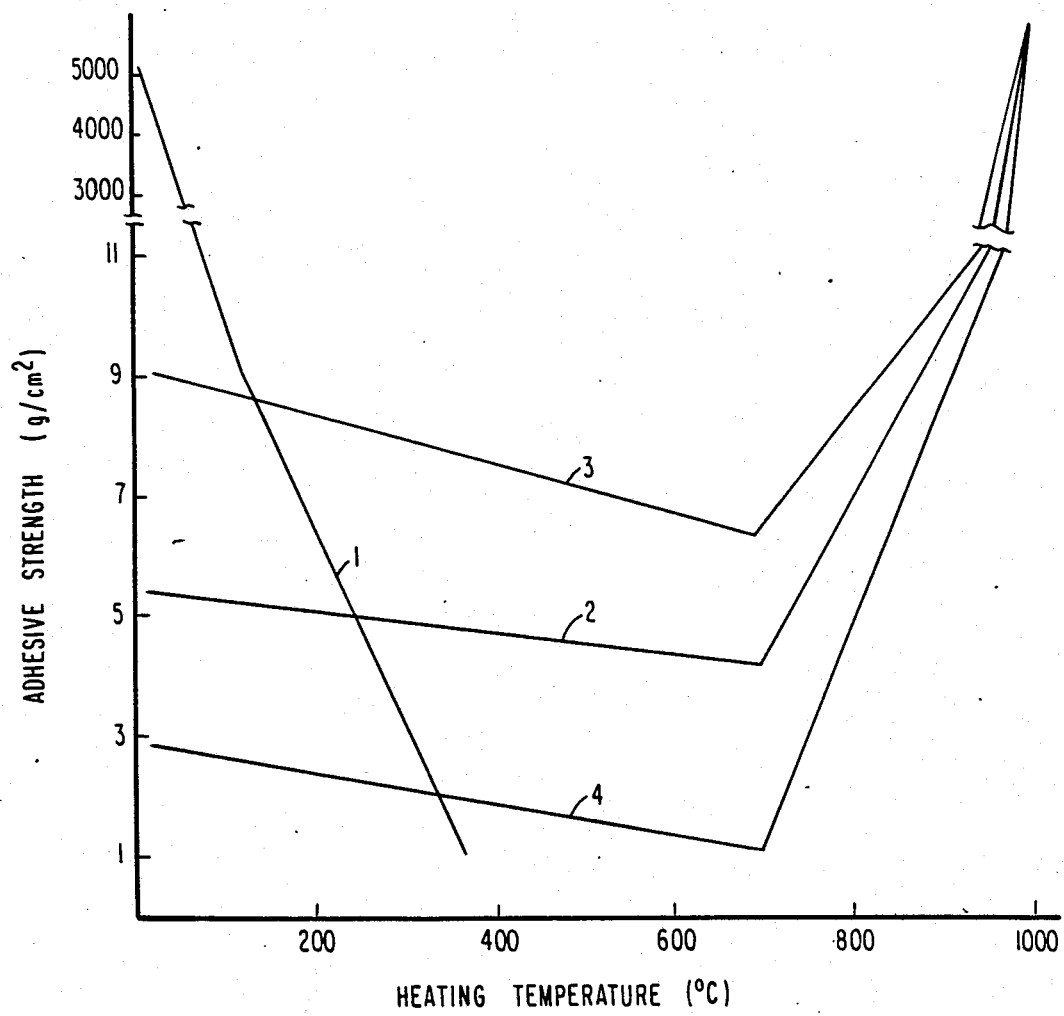

PROCESS FOR FIXING ALLOY POWDER MOLDING AT SINTERING

This application is a continuation of Ser. No. 705,180 filed 2/25/85, now abandoned.

FIELD OF THE INVENTION

The present invention relates to a method for sintering an alloy powder molding by placing an alloy powder molding formed by rolling a mixture of an alloy powder and a synthetic resin-based pressure-sensitive adhesive composition between the alloy powder molding and the metal based material and sintering.

BACKGROUND OF THE INVENTION

When an alloy powder sheet prepared by using a selfmelting alloy powder and a synthetic resin-based adhesive which can be commercially available, or the like, is sintered by placing it on a metal base material, adhesion to the base material can be performed at a temperature up to 200° to 300° C. at which the adhesive acts. However, if the temperature is further raised, the adhesive is destroyed by fire or volatilizes to lose the function of the adhesive and as a result, adhesion to the base material disappears. Accordingly, in the case that weight of the alloy powder sheet acts on the adhesion face of the base material, such as an inclined face, a curved face, a downward face, etc. of the base material, there is a problem that the adhesion cannot support the weight of the sheet and the sheet peels off or falls off from the base material.

On the other hand, an alloy powder sheet formed by rolling a mixture of a wear-resisting eutectic alloy powder and a synthetic resin-based pressure-sensitive adhesive composition as described in , for example, U.S. patent application Ser. No. 547,102, filed Oct. 31, 1983 by the present inventors shows adhesive force and bonding force necessary between the sheet and the base material even at a high temperature ranging from a decomposition temperature of the adhesive of 250° to 400° C. to a sintering temperature of metals and consequently, it has an advantage that a desired wear-resisting alloy layer can be formed on the above-described base material by carrying out sintering processing after placing the sheet of this type on the base material, without causing the above-described problem during the processing.

However, as a result of subsequent studies by the present inventors, it has been found that, in the case of subjecting to sintering processing of the alloy powder sheet described above which suffers vibration and impact during conveying in a furnace such as a mesh-belt type or pusher type continuous furnace, vacuum furnace, etc., there is the possibility of causing separation or falling of the sheet due to the vibration or impact before sintering of metals occurs at a temperature higher than the decomposition temperature of the adhesive when the sheet is placed on metal base material in such a manner that weight of the sheet acts on the adhesion face of the metal base material.

SUMMARY OF THE INVENTION

As a result of earnest studies to overcome the above-described problems, it has been found that there is no possibility of causing separation or falling of the sheet even in the case of carrying out sintering processing in which a specific embodiment of placing is adopted or vibration or impact is applied as described above if a specific composition is interposed between the above-described alloy powder sheet and the metal base material in the case of placing the sheet on the base material and a specific means for raising temperature is adopted in the case of sintering the above-described sheet in such a state. Thus, the present invention has been completed.

Accordingly, an object of the present invention is to provide a composition for fixing at sintering which is used to adhere and fix a molding such as the alloy powder sheet as described above to a metal base material in the stable manner in the case of sintering the molding.

The composition for fixing an alloy powder molding at sintering according to the present invention is used to adhere and fix the alloy powder molding formed by rolling a mixture of an alloy powder and a synthetic resin-based pressure-sensitive adhesive composition to a metal base material by interposing the composition between the molding and the base material until the molding is sintered, in the case that the alloy powder molding is placed on the metal base material and sintered after keeping at 150° to 400° C. for at least 5 minutes under a non-oxidizing atmosphere, and the composition comprises as a main component an acrylic copolymer comprising about 80 to 99.5% by weight of aklyl (meth)acrylate having an average carbon atom number of 2 to 12 in the alkyl moiety and about 20 to 0.5% by weight of a polymerizable monomer having a functional group in the molecule or a mixture of 100 parts by weight of the copolymer and about 0.1 to 100 parts by weight of a resin which gives adhesive property. The composition has a 10 second shear creep compliance of about 0.1 to $30 \times 10^{-6}$ cm$^2$/dyne at room temperature and at least about 30% by weight of non-volatile materials when heated at 300° C. for 80 minutes under a non-oxidizing atmosphere.

BRIEF DESCRIPTION OF THE DRAWING

The FIGURE is a characterist graph indicating the relationship between heating temperature and adhesive strength in the case of carrying out sintering processing of an alloy powder molding with a composition for fixing at sintering of the present invention.

DETAILED DESCRIPTION OF THE INVENTION

The composition of the present invention shows a function of assisting the adhesion of the alloy powder molding to the metal base material by its pressure-sensitive adhesive force at a temperature below the decomposition temperature of 150° C. or so when sintering processing is carried out by interposing the composition between the sheet and the base material. On the other hand, the composition decomposes in the course of raising the temperature to 400° C. or so from the above-described temperature. Accordingly, if this decomposition occurs rapidly, it becomes difficult to prevent separation or falling of the sheet by losing the inherent auxiliary function for adhesion.

However, if temperature is gradually raised in this range, namely, from 150° to 400° C. in such a manner that the composition is kept at the above-described temperature range for at least 4 minutes, the composition causes a thermal decomposition polycondensation reaction to form a tar-pitch adhesive material, and this material exhibits the function of effectively assisting adhesion of the molding to the base material in the specified temperature range and also a temperature range of up to 700° C. at which the molding begins to sinter, which is higher than the temperature of the above range. Accordingly, if sintering processing is carried out by placing the molding on an inclined face, a curved face or a downward face of the base material, the molding does not peel off or fall off during sintering processing.

The composition of the present invention makes it possible to form a desired alloy layer firmly fixed on the metal base material by the bonding between the base material and the alloy powder without causing separation or falling during sintering processing, if a specific sintering processing is carried out by interposing the composition between the alloy powder and the base material.

The acrylic copolymer used in the present invention is a copolymer comprising about 80 to 99.5% by weight, preferably 90 to 98% by weight, of alkyl (meth-)acrylate having an average carbon atom number of 2 to 12 in the alkyl moiety and about 20 to 0.5% by weight, preferably 10 to 2% by weight, of a polymerizable monomer having a functional group in the molecule.

The alkyl (meth)acrylate is one which has the function of reducing the amount of gas generated to prevent occurrence of swelling, etc. in the alloy layer when the composition is carbonized by high temperature heating processing. If the amount of alkyl (meth)acrylate is less than about 80% by weight, the above-described function is poor, and if the amount thereof is more than about 99.5% by weight, there are problems that adhesive property at room temperature deteriorates and working properties are poor. Further, if the average carbon atom number in the alkyl moiety is less than 2 or more than 12, there is a problem that the adhesive property deteriorates.

Examples of alkyl (meth)acrylate include esters of alcohols wherein the alkyl group as the alcohol residue is n-butyl, isobutyl, 1-ethylpropyl, 1-methylpentyl, 2-methylpentyl, 3-methylpentyl, 1-ethylbutyl, 2-ethylbutyl, isooctyl, 2-ethylhexyl, 3,5,5-trimethylhexyl, decyl, dodecyl, etc.

The polymerizable monomer having a functional group in the molecule is a component which mainly contributes to the improvement of adhesive force of the composition at room temperature. If the amount of the monomer is less than about 0.5% by weight, the above-described function is poor, and if the amount thereof is more than about 20% by weight, there is the possibility of causing deterioration of stickiness.

Examples of the polymerizable monomer include acrylic (meth)acrylic acid, crotonic acid, maleic acid, itaconic acid, pheolic acid, fumaric acid, etc. which have carboxyl group as the functional group; 2-hydroxyethyl (meth)acrylate, 2-hydroxypropyl (meth)acrylate, 1-methyl-2-hydroxyethyl (meth)acrylate, 2-hydroxy-vinyl ether, etc. which ahve hydroxyl group as the functional group; glycidyl acrylate (meth)acrylate having epoxy group as the functional group; N-methylol (meth)acrylamide having methylol group as the functional group; and N,N-dimethylaminoethyl (meth)acrylate, N-tertiary butylaminoethyl (meth)acrylate, N-tertiary butylaminobutyl (meth)acrylate, etc. which have amino group as the functional group.

The number average molecular weight of the acrylic copolymer is about 50,000 or more and preferably 70,000 to 1,500,000. If the molecular weight is too small, adhesive force for fixing of the molding at room temperature and at high temperature heating is poor.

In the present invention, the acrylic copolymer can be used along or the acrylic copolymer can be used together with a resin which gives adhesive property. The resin which gives adhesive property is a component which mainly contributes to the adhesive force at room temperature, and is used in an amount of about 0.1 to 100 parts by weight, preferably 5 to 70 parts by weight, per 100 parts by weight of the acrylic copolymer. If the amount of the resin is less than about 0.1 part by weight, the above-described effect is not obtained, and if the amount thereof is more than about 100 parts by weight, the above-described characteristics of the acrylic copolymer deteriorate.

Examples of the resin which gives adhesive property include phenol resin, coumarone-indene resin, polyterpene resin, rosin resin, petroleum resin, polyvinyl ether resin, etc.

The composition for fixing at sintering of the present invention comprises the acrylic copolymer or a mixture of the acrylic copolymer and the resin which gives adhesive property. If desired and necessary, various additives, for example, xylene resin, paraffin wax, process oil and abietyl alcohol as softening agents, calcium carbonate, silica and talc as fillers, and dioctyl phthalate, dioctyl adipate, triphenyl phosphate and dibutyl phthalate as plasticizers, can be added to the composition.

The composition comprising such constituting components must have a 10 second shear creep compliance of about 0.1 to $30 \times 10^{-6}$ cm$^2$/dyne at room temperature. If the value is less than about $0.1 \times 10^{-6}$ cm$^2$/dyne, the molding lacks in adhesive force for fixing when heating at not only a high temperature but also a low temperature which is less than decomposition temperature, and if the value is more than about $30 \times 10^{-6}$ cm$^2$/dyne, holding force is poor to cause problems such as separation because of being too soft.

The 10 second shear creep compliance means "ability to shear" of a high molecular material measured under a specific condition as follows. A molded sample having a thickness of 500 μm is placed on a smooth film (for example, a polytetrafluoroethylene film) and put in a parallel plate shear creep plast tester. After a weight is applied thereto, deformation shear (d), area of the sample (A), thickness of the sample (h) and acceleration of gravity of the weight (F) are measured, and the value is determined by the following formula.

$$J(t) = Ad/hF$$

wherein J (t) is shown as cm$^2$/dyne when d and h are expressed in cm and F is expressed in dyne. t represents time (second).

When J (10) is 0.1 to $30 \times 10^{-6}$ cm$^2$/dyne, adhering area of the polymer on the face to be applied is increased and interfacial separation is not induced.

Further, it is important that the composition of the present invention has at least about 30% by weight of non-volatile materials, namely, about 70% or less of volatile materials, when heated at 300° C. for 80 minutes under a non-oxidizing atmosphere, by which the effects of the present invention can be first obtained. In other words, if the amount of the nonvolatile materials is less than bout 30% by weight, it is not possible to improve adhesive force for fixing of the molding during heating at high temperature.

The amount of non-volatile materials can be easily determined by using the above-described acrylic copolymer or by suitably selecting the kind of amount of the resin which gives adhesive property or additives. A particularly preferred amount of the non-volatile materials is in a range of 45 to 75% by weight.

A method of using the composition for fixing at sintering of the present invention is explained below.

Firstly, when the alloy powder molding formed by rolling a mixture of the alloy powder and the synthetic resin-based pressure-sensitive adhesive composition is placed on a metal base material, the composition for fixing at sintering is interposed between the base material and the molding. The interposition may be carried out by using a film of the composition previously molded, or may be carried out by applying the composition to one or both of the base material and the molding.

Thickness of the film or the coating layer of the interposed composition is in a range of about 5 to 50 μm, preferably 10 to 30 μm. If the thickness is too thin, the effect of the present invention is not obtained. If it is too thick, the amount of gas generated on the interface between the base material and the molding becomes large to cause a problem that fixing at sintering deteriorates or bonding strength after sintering is reduced.

The alloy powder molding used is a product obtained by rolling and shaping a mixture of the alloy powder and the synthetic resin-based pressure-sensitive adhesive composition into sheet or analogous shape. In the case of a sheet material, the sheet having a thickness of 0.5 to 5 mm or so is generally used.

As the alloy powders, those described in U.S. patent application Ser. No. 547,102 can be used. In particular, Fe-M-C system wear-resisting eutectic alloy powders are preferably used. M in the Fe-M-C system includes at least one of Mo, B and P as a major component and may contain Cr, V, W, Nb, Ta and Ti as secondary elements. M may further contain Si, Ni,Mn, etc. as other elements.

Such multi-component eutectic alloy powders have a characteristic that the sintering temperature is comparatively low, the liquid phase is about 10 to 50% by weight in a temperature range of 1,000° to 1,150° C. and the liquid phase has a good wetting property to the base material. Each element in the multi-component eutectic alloy powders has the following function.

In a multi-component eutectic alloy powder wherein M is P, P bonds to Fe and C to form a phosphorous eutectic crystal and also has the functions of improving wear resistance and reducing the melting point. P is generally used in an amount of 0.5 to 2.55 by weight. C bonds to Fe and P to strengthen the base and form a hard phase, and also forms a phosphorous eutectic crystal to increase density and serve for bonding to the base material. C is generally used in an amount of 1.5 to 4.0% by weight.

In a multi-component eutectic alloy powder wherein M is Mo, Mo contributes to strengthening of the base and formation of a hard phase and, at the same time, has the function of reducing the melting point by bonding to Fe and C. Mo is generally used in an amount of 2.5 to 10.5% by weight. Further, in a multi-component eutectic alloy powder wherein M is B, B bonds to Fe and C to form a hard phase, similar to the case of P or Mo, and, at the same time, has the function of reducing the melting point. B is generally used in an amount of 0.5 to 3.0% by weight.

Cu, V, W, Nb, Ta and Ti used as secondary elements in these multi-component eutectic alloy powders serve for strengthening of the base, particularly, improvement of toughness, and they are suitable elements for forming a hard phase by bonding to C. Those components each is used in an amount of 10% by weight or less. Si is an element which improves flowing property of molten materials in case of producing an alloy powder, and simultaneously improves wetting property to the base material in case of adhering. Si is generally used in an amount of 5.0% by weight or less. Further, Ni and Mn are elements which serve for strengthening the base. Those components each is used in an amount of 5.0% by weight or less.

The wear-resisting eutectic alloy powders having the above constitution preferably have a particle size of 150 meshes or less in view of the fact that the particle size greatly affects the porosity of the sintered phase. If the particle size is larger than the above-described value, wear resistance of the sintered phase is damaged due to the increase of porosity.

If desired and necessary, other metal powders such as stainless steel, etc. having the same particle size as described above can be used together with the wear-resisting eutectic alloy powder having the above described constitution. Other metal powders are used in an amount of about 20 to 80% by weight based on the total weight of other metal powders and the eutectic alloy powder.

As the synthetic resin-based pressure-sensitive adhesive composition which is blended with the alloy powder, the above-described acrylic copolymer which is used as a main component for the composition for fixing at sintering of the present invention or an acrylic pressure-sensitive adhesive composition composed of the acrylic copolymer and the resin which gives adhesive property is suitably used.

A desired alloy powder molding is obtained by a process which comprises diluting the synthetic resin-based pressure-sensitive adhesive composition with a suitable solvent such as acetone, toluene, methyl ethyl ketone, etc., adding the alloy powder in an amount of 10 to 100 parts by weight based on 1 part by weight of the solid content of the resulting mixture, kneading the mixture, casting it into a mold covered generally with a releasing paper, volatilizing the solvent, and then molding into sheet or another shape by rolling with rolls.

This molding is subjected to sintering processing under a non-oxidizing atmosphere by interposing the composition for fixing at sintering of the present invention between the molding and the metal base material. In this case, it is necessary to keep a temperature range of 150° to 400° C. for at least 5 minutes before the temperature is raised to a sintering temperature. Namely, by keeping at the above temperature range for the specified time, the composition is converted into a tar pitch-like adhesive material which effectively contributes to adhesion without causing rapid decomposition, whereby the molding is stably fixed to the base material by adhesion until the temperature is raised to the sintering temperature.

If the temperature to be kept is lower than 150° C., the amount of decomposition becomes too small, and if it is higher than 400° C., rapid decomposition is caused, whereby the tar pitch-like adhesive material which effectively contributes to adhesion is difficult to form. in the case that the keeping time is less than 5 minutes, the same undesired result as described above is obtained. The upper limit of the keeping time is not particularly restricted, but the keeping time is generally up to 120 minutes.

The reason why the sintering processing is carried out under a non-oxidizing atmosphere is apparent. Namely, a desired alloy layer cannot be formed in an oxidizing atmosphere, because the molding is oxidized to cause deterioration during the processing. The non-oxidizing atmosphere includes not only hydrogen gas atmosphere and nitrogen gas atmosphere but also vacuum, etc.

After kept as described above, the temperature is raised to a sintering temperature and kept for a specified time, by which the above described tar pitch-like adhesive material is finally completely carbonized and disappears. On the other hand, liquid phase is crystallized out by eutectic components in the molding and diffuse into the base material, whereby an alloy layer firmly bonded to the base material is formed.

The FIGURE is to clarify the effect of adhesion obtained by keeping the composition for fixing at sintering of the present invention at a temperature range of 150° to 400° C. The FIGURE indicates the result of examining the shear adhesive strength over the temperature range of 100° C. to 1,000° C. when the alloy powder sheet having a density of 4.8 g/m$^3$ and a thickness of 2 mm according to Exmaple 1 described later is cut in a size of 1 cm × 1 cm, a sheet composed of a composition for fixing at sintering according to Example 1 described later having the same size as described above and a thickenss of 10 μm is adhered to the sheet and the assembly is adhered to a vertical face of a steel base material directly or after subjected to heat treatment at the above described temperature range for a specified time.

In the FIGURE, Curve 1 means the case where the sample was not treated, Curve 2 means the case where the sample was subjected to heat treatment at 250° C. for 60 minutes in a hydrogen gas atmosphere, Curve 3 means the case where the sample was subjected to heat treatment at 300° C. for 60 minutes in a hydrogen gas atmosphere, and Curve 4 means the case where the sample was subjected to heat treatment at 380° C. for 60 minutes in a hydrogen gas atmosphere.

As is apparent from the FIGURE, in the case of no treatment, the initial adhesive strength is large, but it reduces to less than 1 g/cm$^2$ in the neighborhood of 400° C., and falling of the sheet from the base material cannot be prevented. The reason for this is that since the alloy powder sheet used for the above-described examination has a weight of 0.96 g, a shear force of 0.96 g/cm$^2$ acts on the adhesion face and an adhesive strength of higher than the above-described value should be maintained in order to prevent falling of the sheet from the base material.

On the contrary, in Curves 2, 3 and 4 in which the specified heat treatment is carried out, although the initial adhesive strength is reduced to that extent, adhesive strength which is capable of preventing falling of the sheet is still maintained in the neighborhood of 400° C. and also in the neighborhood of 700° C. at which sintering begins. These facts mean that a tar pitch-like adhesive material which contributes to adhesion is formed is formed in the interposed sheet by the above-described heat treatment. After raising to the sintering temperature, the adhesive strength begins to increase reversely by a diffusion effect due to liquid phase and, finally, a high adhesive strength is obtained.

The present invention is explained in greater detail by reference to the following non-limiting examples. In the examples, "part" and "%" means part by weigh and "% by weight", respectively.

EXAMPLE 1

2-Ethylhexyl acrylate 90 parts
Ethyl acrylate 3 parts
Methyl methacrylate 2 parts
Acrylic acid 5 parts
Ethyl acetate 100 parts
Benzoyl peroxide 0.1 part Each of the above-described components was fed in a reactor. The mixture was subjected to polymerization reaction at 60° C. for 8 hours to obtain a solution containing an acrylic copolymer having a weight average molecular weight of 700,000. This solution was used as the composition for fixing at sintering of the present invention. The solution was applied to a releasing paper and dried to obtain a sheet having a thickness of 10 μm. This sheet has a 10 second shear creep compliance of $1.2 \times 10^{-6}$ cm$^2$/dyne and had 65% of non-volatile materials when heated at 300° C. for 80 minutes in hydrogen gas.

On the other hand, after 48.5% of a multi-component eutectic alloy powder having a particle size of 150 meshes or less composed of Mo 10.5%, Cr 2.5%, P 2.4%, C 3.6% and the balance of Fe, 48.5% of a powder having a particle size of 150 meshes or less composed of SUS 410 and 3% of an alkyl (meth)acrylate resin were kneaded by a wet process using acetone as a solvent, the mixture was molded by rolling to produce an alloy powder sheet having a thickness of 2 mm and a density of 4.8 g/cm$^3$.

This sheet was cut in a size of 1 cm × 1 cm. After the sheet was adhered to the above-described sheet for fixing at sintering which was cut in the same size as described above, the assembly was adhered to a vertical face of a steel base material. The composite was heated in a hydrogen gas atmosphere at a raising rate of 15° C./minute and kept at 300° C. for 60 minutes. The composite was then heated to a temperature of 1,090° C. at a raising rate of 15° C./minute and kept at this temperature for 20 minutes, followed by gradually cooling.

Thus, a wear-resisting alloy layer having a thickness of 1.6 to 1.65 mm, a hardness of 62 to 65 as HRC and a density of 7.6 to 7.75 g/cm$^3$ which was firmly bonded to the steel base material was formed without causing falling of the alloy powder sheet during the sintering processing.

In another experiment, a sheet for fixing at sintering used in Example 1 was kept at 300° C. for 60 minutes and heated at 500° C. When weight of carbon element and hydrogen element was examined, C was 91.7% and H was 5.9%, and H/C was 0.77. Since materials called pitches had H/C in a range of from 1.0 in case of asphalts to 0.5 to 0.6 in case of coal tar pitches, it is apparent that a tar pitch-like material is formed by the above described heat treatment to remarkably contribute to fixing by adhesion of the powder sheet.

EXAMPLE 2

Butyl acrylate 87 parts
Vinyl acetate 5 parts
Ethyl acrylate 5 parts
2-Hydroxyethyl acrylate 3 parts
Ethyl acetate 150 parts
Benzoyl peroxide 0.5 part Each of the above-described components was fed in a reactor. The mixture was subjected to polymerization reaction at 70° C. for 10 hours to obtain a solution containing an acrylic copolymer having a weight average molecular weight of 600,000. To this solution, a terpene-phenol resin was added as a resin which gives adhesive property in an amount of 30 parts per 100 parts of the acrylic copolymer to prepare a composition for fixing at sintering of the present invention. The solution was applied to a releasing paper and dried to form a sheet having a thickness of 30 μm. This sheet has a 10 second shear creep compliance of $1.8 \times 10^{-6}$ cm$^2$/dyne and had 70% of non-volatile materials when heated at 300° C. for 80 minutes in hydrogen gas.

On the other hand, after 58.8% of a multi-component eutectic alloy powder used in Example 1, 39.2% of a powder having a particle size of 150 meshes or less composed of SUS 410 and 2% of an alkyl acrylate (methacrylate) resin were kneaded by a wet process using toluene as a solvent, the mixture was molded by rolling to produce an alloy powder sheet having a thicknes of 1 mm and a density of 4.65 g/cm$^3$.

This sheet was cut in a size of 1 cm × 1 cm. After the sheet was adhered to the above-described sheet for fixing at sintering which was cut in the same size as described above, the assembly was adhered to a vertical face of a steel base material. The assembly was heated in a hydrogen gas atmosphere at a raising rate of 20° C./minute, and kept at 200° C. for 80 minutes. The assembly was then heated to a temperature of 1,080° C. at a raising rate of 15°C./minute and kept at this temperature for 15 min, followed by gradually cooling.

Thus, a wear-resistig alloy layer having a thickness of 0.8 to 0.82 mm, a hardness of 61 to 63 as HRC and a density of 7.6 to 7.7 g/cm$^3$ which was firmly bonded to the steel base material was formed without causing falling of the alloy powder sheet during the sintering processing.

EXAMPLE 3

Isooctyl acrylate 97.9 parts
Glycidyl methacrylate 0.1 part
Acrylic acid 2 parts
Toluene 120 parts
Benzoyl peroxide 0.2 part Each of the above-described components was fed in a reactor. The mixture was subjected to polymerization reaction at 75° C. for 8 hours to obtain a solution containing an acrylic copolymer having a weight average molecular weight of 500,000. This solution was used as the composition for fixing at sintering of the present invention. The solution was applied to a releasing paper and dried to obtain a sheet having a thickness of 10 μm. This sheet has a 10 second shear creep compliance of $0.7 \times 10^{-6}$ cm$^2$/dyne and had 52% of non-volatile materials when heated at 300° C. for 80 minutes in hydrogen gas.

On the other hand, after 38.6% of a multi-component eutectic alloy powder used in Example 1, 57.9% of a powder having a particle size of 150 meshes or less composed of SUS 410 and 3.55 of an alkyl acrylate (methacrylate) resin were kneaded by a wet process using toluene as a solvent, the mixture was molded by rolling to produce an alloy powder sheet having a thickness of 1.5 mm and a density of 4.8 g/cm$^3$.

This sheet was cut in a size of 1 cm × 1 cm. After the sheet was adhered to the above-described sheet for fixing at sintering which was cut in the same size as described above, the assembly was adhered to a vertical face of a steel base material. The composite was heated in a hydrogen gas atmosphere at a raising rate of 10° C./minute and kept at 380° C. for 30 minutes. The composite was then heated to a temperature of 1,100° C. at a raising rate of 15° C./minute and kept at this temperature for 20 minutes, followed by gradually cooling.

Thus, a wear-resisting alloy layer having a thickness of 1.3 to 1.35 mm, a hardness of 60 to 62 as HRC and a density of 7.5 to 7.7 g/cm$^3$ which was firmly bonded to the steel base material was formed without falling of the alloy powder sheet during the sintering processing.

While the invention had been described in detail and with reference to specific embodiments thereof, it will be apparent to one skilled in the art that various changes and modifications can be made therein without departing from the spirit and scope thereof.

What is claimed is:

1. A method of sintering an alloy powder molding which comprises placing an alloy powder molding which is formed by rolling a mixture of an alloy powder and a synthetic resinbased pressure-sensitive adhesive composition, on a metal base material by interposing a composition between the alloy powder molding and the metal base material, keeping the assembly at 150° to 400° C. for at least 5 minutes under a non-oxidizing atmosphere, and sintering the alloy powder molding at a sintering temperature, the improvement wherein the composition at a sintering temperature, the improvement wherein the composition comprises as a main component an acrylic copolymer which comprises about 80 to 99.5% by weight of alkyl (meth)-acrylate having an average carbon atom number of 2 to 12 in the alkyl moiety and about 20 to 0.5% by weight of a polymerizable monomer having a functional group in the molecule or a mixture of 100 parts by weight of the copolymer and about 0.1 to 100 parts by weight of a resin which gives adhesive property, the composition having a 10 second shear creep compiance of about 0.1 to $30 \times 10^{-6}$ cm$^2$/dyne at room temperature and at least about 30% by weight of non-volatile materials when heated at 300° C. for 80 minutes under a non-oxidizing atmosphere.

2. The process of claim 1, wherein the acrylic copolymer comprises 90 to 98% by weight of the alkyl (meth)acrylate and 10 to 2% by weight of the polymerizable monomer.

3. The process of claim 1, wherein the alkyl (meth)acrylate is an ester of alcohols wherein the alkyl group is selected form the group consisting of n-butyl, isobutyl, 1-ethylpropyl, 1-methylpentyl, 2-methylpentyl, 3-methylpentyl, 1-ethylbutyl, 2-ethylbutyl, isooctyl, 2-ethylhexyl, 3,5,5-trimethylhexyl, decyl and dodecyl.

4. The process of claim 1, wherein the polymerization monomer is selected from the group consisting of a monomer having a carboxyl group as the functional group, a monomer hving a hydroxyl group as the functional group, a monomer having an epoxy group as the functional group, a monomer having a methylol group as the functional group and a monomer having an amino group as the functional group.

5. The process of claim 1, wherein the amount of the resin which gives adhesive property is 5 to 70 parts by weight per 100 parts by weight of the acrylic copolymer.

6. The process of claim 1, wherein the resin which gives adhesive property is selected from the group consisting of phenol resin, coumarone-indene resin, polyterpene resin, rosin resin, petroleum resin and polyvinyl ether resin.

* * * * *